US012667043B2

(12) United States Patent
Litwiller et al.

(10) Patent No.: US 12,667,043 B2
(45) Date of Patent: Jun. 30, 2026

(54) DOWNFORCE LOAD SENSOR FOR A PLANTER ROW UNIT

(71) Applicant: Precision Planting LLC, Tremont, IL (US)

(72) Inventors: Riley Litwiller, Tremont, IL (US); William Frank, Manito, IL (US)

(73) Assignee: Precision Planting LLC, Tremont, IL (US)

( * ) Notice: Subject to any disclaimer, the term of this patent is extended or adjusted under 35 U.S.C. 154(b) by 352 days.

(21) Appl. No.: 18/264,524

(22) PCT Filed: Nov. 12, 2021

(86) PCT No.: PCT/IB2021/060477
§ 371 (c)(1),
(2) Date: Aug. 7, 2023

(87) PCT Pub. No.: WO2022/185114
PCT Pub. Date: Sep. 9, 2022

(65) Prior Publication Data
US 2024/0040958 A1     Feb. 8, 2024

Related U.S. Application Data

(60) Provisional application No. 63/155,644, filed on Mar. 2, 2021.

(51) Int. Cl.
A01C 7/20 (2006.01)
(52) U.S. Cl.
CPC .................................. A01C 7/205 (2013.01)

(58) Field of Classification Search
CPC .......... A01C 7/201; A01C 7/203; A01C 7/205
See application file for complete search history.

(56) References Cited

U.S. PATENT DOCUMENTS 5,081,942 A * 1/1992 Clark et al. ............ A01C 5/064
111/926
6,389,999 B1 5/2002 Duello
(Continued)

FOREIGN PATENT DOCUMENTS

CA      3071503 A1 * 9/2020 .......... A01B 63/008
MX  2014007790 A   12/2015
(Continued)

OTHER PUBLICATIONS

European Patent Office, Search Report for related PCT Application No. PCT/IB2021/060477, dated Jan. 31, 2022, 15 pages.
(Continued)

*Primary Examiner* — Tara Mayo

(57) ABSTRACT

A downforce load sensor for a planter row unit includes a load sensing connector rod coupled with a depth selector of the planter row unit. The load sensing connector rod is disposed to receive a load applied by a stop member supported on the row unit frame, the stop member being in abutment with an abutment member of a gauge wheel arm of a furrow opening assembly of the planter row unit. The load sensing connector rod generating load signals corresponding to a downforce applied to the soil by the gauge wheels of the furrow opening system of the planter row unit.

16 Claims, 13 Drawing Sheets

(56)                    References Cited

U.S. PATENT DOCUMENTS

| 6,701,857 | B1 | 3/2004 | Jensen et al. |
| 8,561,472 | B2 | 10/2013 | Sauder et al. |
| 9,338,937 | B2 | 5/2016 | Sauder et al. |
| 10,548,254 | B2 | 2/2020 | Sauder et al. |
| 2015/0020612 | A1 | 1/2015 | Witt et al. |
| 2015/0351313 | A1 | 12/2015 | Dienst |
| 2020/0015412 | A1 | 1/2020 | Kowalchuk et al. |
| 2020/0281112 | A1 | 9/2020 | Salowitz et al. |

FOREIGN PATENT DOCUMENTS

| WO | 2020112016 | A1 | 6/2020 |
| WO | 2022185114 | A1 | 9/2022 |

OTHER PUBLICATIONS

UK Intellectual Property Office, Search Report for related UK Application No. GB2102236.2, dated 27 AGO 2021, 4 pages.

\* cited by examiner

DOWNFORCE LOAD SENSOR FOR A PLANTER ROW UNIT

CROSS-REFERENCE TO RELATED APPLICATIONS

This application is a national phase entry under 35 U.S.C. § 371 of International Patent Application PCT/IB2021/060477, filed Nov. 12, 2021, designating the United States of America and published in English as International Patent Publication WO 2022/185114 A1 on Sep. 9, 2022, which claims priority to U.S. Provisional Application No. 63/155,644, filed 2 Mar. 2021, which is incorporated herein by reference in its entirety.

BACKGROUND

When planting with a row-crop planter, it is recognized that sufficient downforce must be exerted on the row unit to ensure full penetration of the furrow opening disk blades into the soil to the pre-selected furrow depth and also to provide some degree of soil compaction by the gauge wheels to ensure proper furrow formation. It is also recognized, however, that excessive downforce will cause over compaction of the soil which may, in turn, result in improper root growth and/or poor germination due to re-opening of the furrow.

FIGS. 1, 4 and 7 are intended to represent soil profiles under the furrow opening assembly 34 of a conventional planter that is subject to differing amounts of downforce. Specifically, FIG. 1 illustrates a soil profile with an ideal amount of downforce being exerted so as to achieve full penetration to the preset depth of the disk blades 32-1, 32-2 and with just enough compaction exerted on the surrounding soil by the gauge wheels 34-1, 34-2 to ensure proper furrow formation but without excess soil compaction of the surrounding soil. FIG. 2 represents the same soil profile after the seed 41 is deposited but prior to being covered with soil by the furrow closing assembly 30. FIG. 3 is intended to represent that same soil profile after being covered with soil by the furrow closing assembly 50.

FIGS. 4-6 are similar to FIGS. 1-3 but are intended to represent the effects of too little downforce being exerted by the gauge wheels 34-1, 34-2. In such a situation, the disk blades 32-1, 32-2 may not penetrate into the soil to the full desired depth and/or the soil may collapse into the furrow 39 as the seeds 41 are being deposited resulting in irregular seed depth.

FIGS. 7-9 are also similar to FIGS. 1-3 but represent the effects of excessive downforce being applied. The soil is being compacted excessively adjacent to the seed furrow 39 resulting in substantial differences in soil density between the furrow walls when compared to the soil density on either side of the furrow. Under such extreme conditions, the compaction of the furrow walls and the soil below the furrow 39 prevents the roots from easily penetrating the adjacent soil, which may result in the roots being prevented from growing conically downward perpendicular to the direction of the furrow. Poor root penetration may result in weak stands and may place the crops under unnecessary stress during drier conditions. In addition to inadequate root penetration, as illustrated in FIG. 9, when the soil is overly compacted by the gauge wheels, the furrow may re-open along the centerline of the furrow due to the differing soil densities as the soil dries out, resulting in poor seed-to-soil contact and/or drying out of the seed causing poor germination and seedling death.

Many growers speculate as to whether the amount of downforce set for the planter is appropriate by observing the soil profile after planting a stretch of soil to determine the looseness or compactness of the soil around the seed furrow. Simply visually inspecting the soil is imprecise and it is difficult for most growers to accurately judge whether or not they are planting with too little or too great of downforce. Furthermore, the appropriate amount of downforce to be applied may be different across the field due to varying soil conditions.

U.S. Pat. No. 6,389,999 to Duello (hereinafter "Duello '999") describes a system for dynamically controlling excess downforce during planting operations by employing a load sensor, such as a strain gauge, placed on or incorporated into the gauge wheel mounting structure to detect the compressive forces being exerted upon the gauge wheel mounting structure. Duello '999 further describes the use of a microprocessor, or the like, adapted to receive the signals from the pressure sensor and to actuate the planter's hydraulic system or a supplemental down-pressure system to regulate the amount of downforce exerted on the planter row units in relation to a value previously selected by the grower. Duello '999 further discloses that the pre-selected downforce value may be variable based on pre-selected values entered into field mapping system utilizing global positioning.

U.S. Pat. No. 6,701,857 to Jensen et al. (hereinafter "Jensen '857") discloses a system for automatically adjusting the downforce during planting operations. Specifically, Jensen '857 discloses the use of a Wheatstone bridge strain gage circuit applied to the gauge wheel arms to detect the amount of strain due to bending stresses exerted on the arms. The strain exerted on the gauge wheel arms corresponds to the change in resistance or output voltage of the Wheatstone bridge circuit. The output voltage is transmitted to a closed loop electronic control unit connected to the electrical and hydraulic or pneumatic system of the tractor used for regulating the downforce applied by the planter. A microprocessor functions to compare the detected downforce to a downforce value pre-selected by the grower and to automatically actuate the planter's hydraulic or pneumatic system accordingly to increase or decrease the downforce as required to maintain the detected downforce at or near the pre-selected downforce value. Jensen also proposes the concept of measuring a shear load at a pin in the depth control mechanism but fails to provide any discussion or drawing figures on how to do so.

While the foregoing patents describe the benefit of being able to monitor and control downforce during planting operations and the general theory of utilizing a pressure sensor in the "gauge wheel mounting structure" (Duello '999) or on the "gauge wheel arms" (Jensen '857) neither patent describes in sufficient detail a practical working embodiment that can accurately and consistently determine and monitor downforce during planting operations. For example, changes in the depth setting of the planter unit can result in a different loading conditions on the gauge wheel arms and gauge wheel mounting structure which can vary the output signal of the pressure sensor. Additionally, due to the location, the sensitive gauges and wires used for monitoring the downforce must be shielded or protected to avoid damage from debris during planting operations.

U.S. Pat. Nos. 8,561,472 and 9,338,937 and 10,548,254 to Sauder et al. and assigned to Precision Planting LLC (respectively the "Sauder '472", "Sauder '937" and "Sauder '254") are directed to a load sensing pin for an agricultural implement which overcome the deficiencies of Duello '999 and Jensen '857, but the load sensing pin embodiments disclosed Sauder '472, Sauder '937 and Sauder '254 and not adapted for use with certain makes of commercially available planter row units, namely, the row units of John Deere planter model numbers 9000, 1100 and 2100 or similarly configured row units, due to the configuration of those row units.

Accordingly, there remains a need for a system for monitoring downforce on a planter row units of John Deere planter model numbers 9000, 1100 and 2100 and similarly configured row units, that is robust yet economical to produce and that provides accurate measurements (preferably without calibration) regardless of the position of the depth regulation member.

Figure 14:
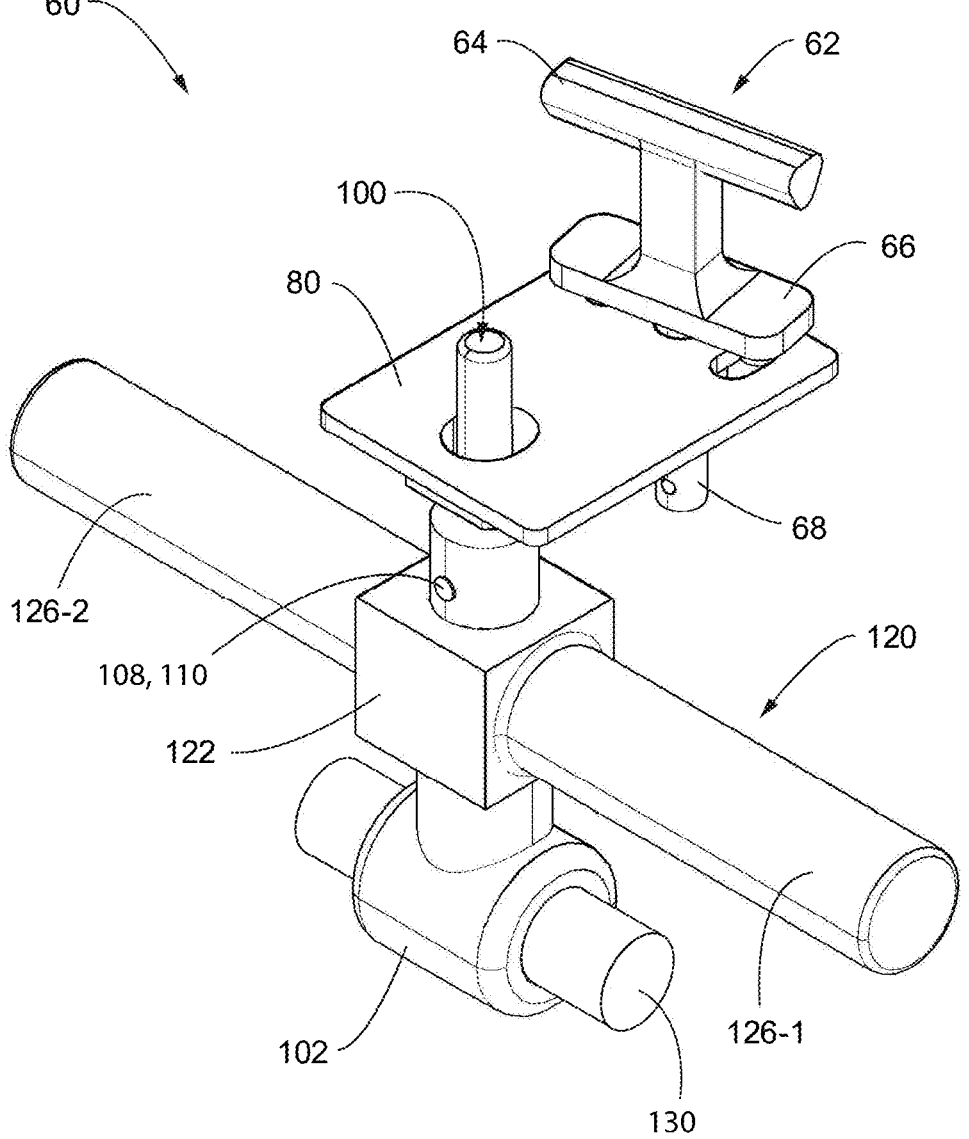
FIG. 14 is an enlarged perspective view of the existing depth adjustment mechanism of the existing row unit of FIG. 10 with the row unit frame and other components of the row unit removed.

16A in place of the connector rod of the existing depth adjustment mechanism of FIG. 14.

Figure 16A:
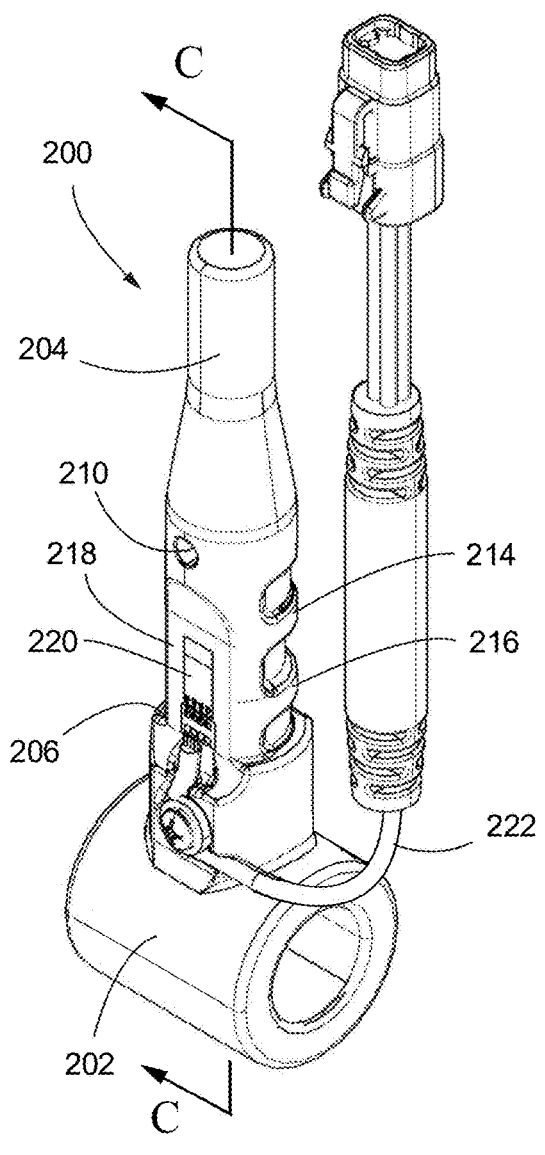
FIG. 16A-16B are perspective views of an embodiment of a load sensing connector rod.
Figure 17:
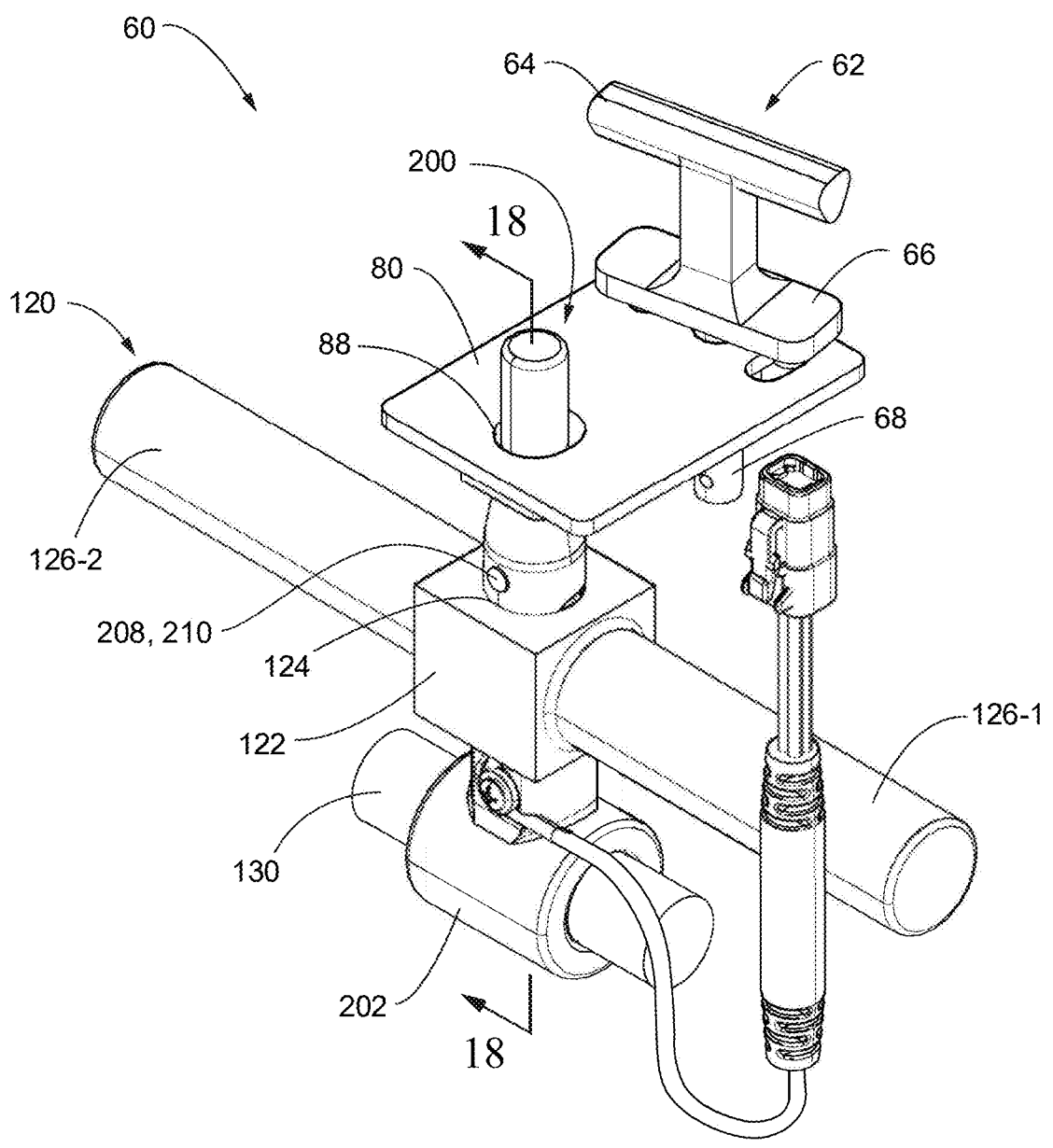
FIG. 17 is the same perspective view of a depth adjustment mechanism substantially the same as illustrated in FIG. 14, but incorporating the load sensing connector rod of FIG.
Figure 18:
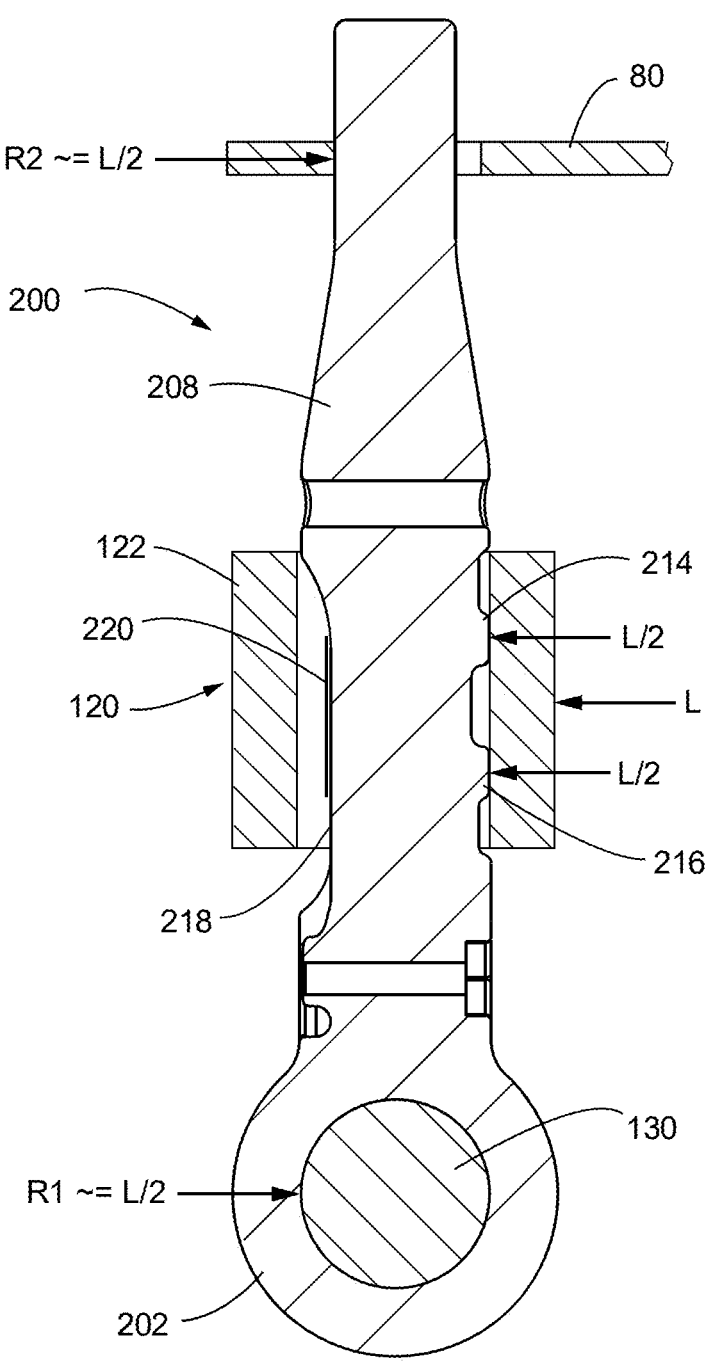

FIG. 18 is a cross-sectional view of the depth adjusting mechanism of FIG. 17 incorporating the load sensing connector rod of FIG. 16A as viewed along lines 18-18 of FIG. 17, and illustrating the loads and reactionary forces applied to the load sensing connector rod.

DETAILED DESCRIPTION

Figure 10:
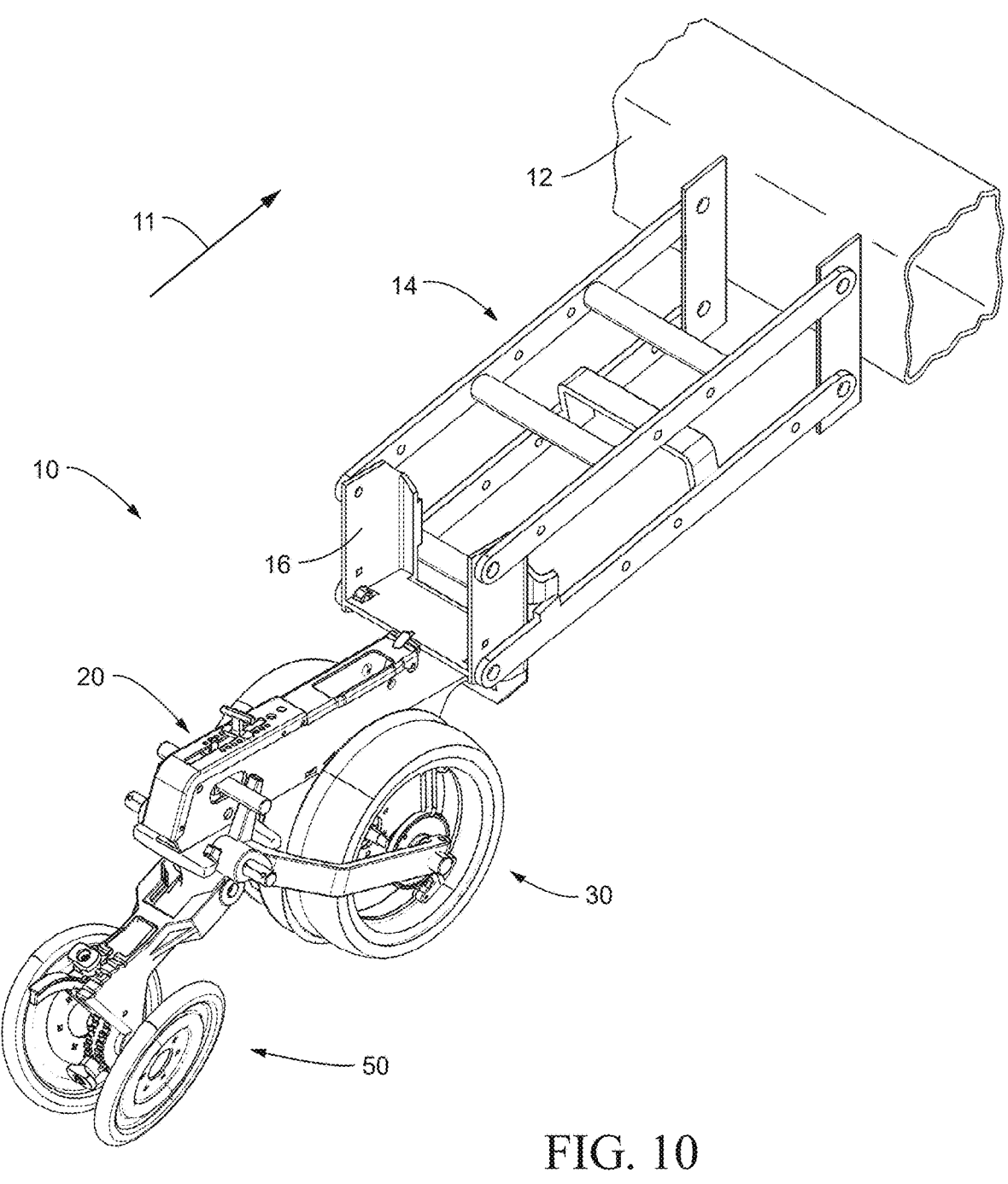
FIG. 10 is a perspective view representative of an existing row unit of a John Deere planter model number 9000, 1100 or 2100, each of which have substantially similar configurations.
Figure 11:
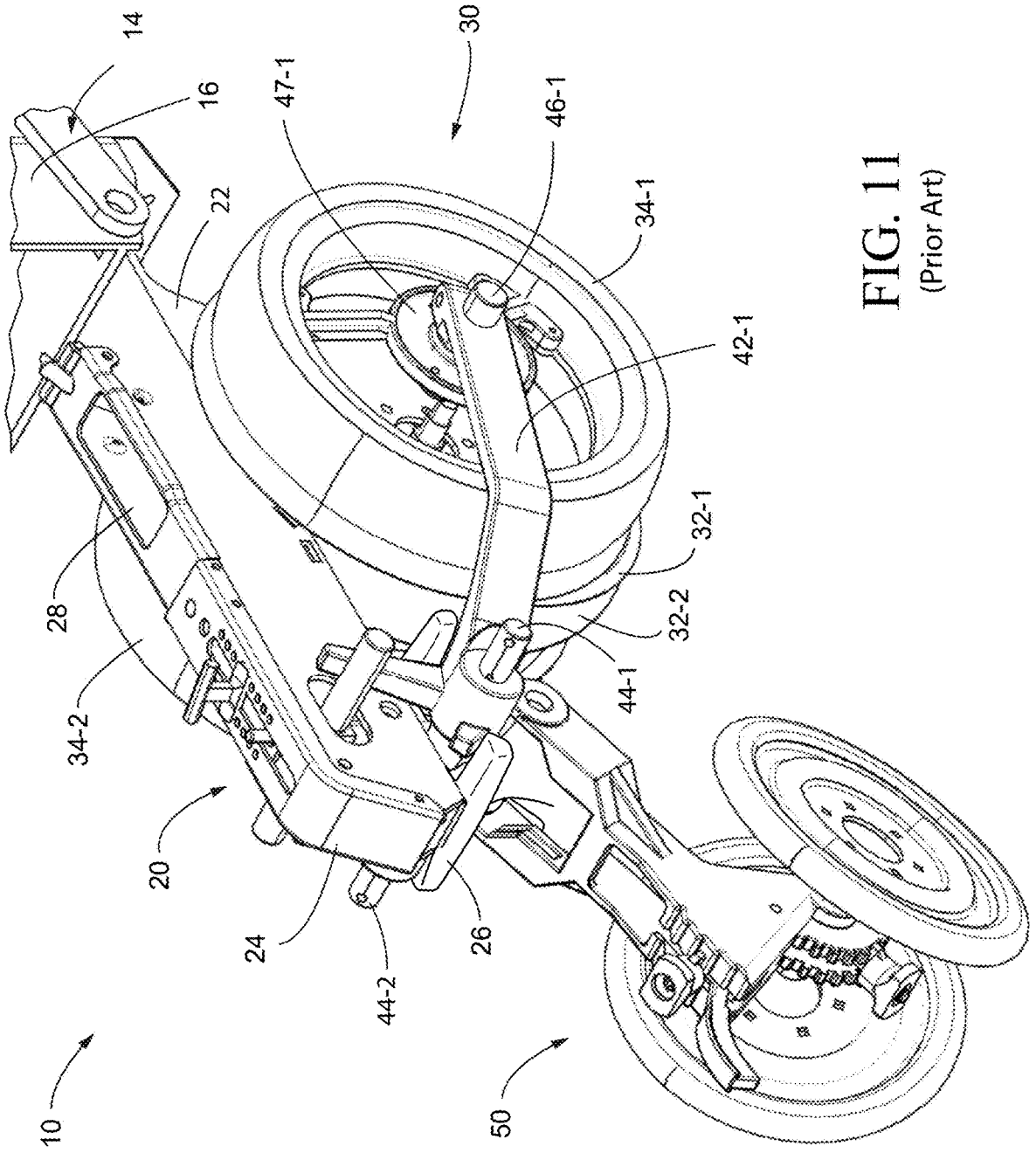
FIG. 11 is an enlarged perspective view of a portion of the existing row unit of FIG. 10.
Figure 12:
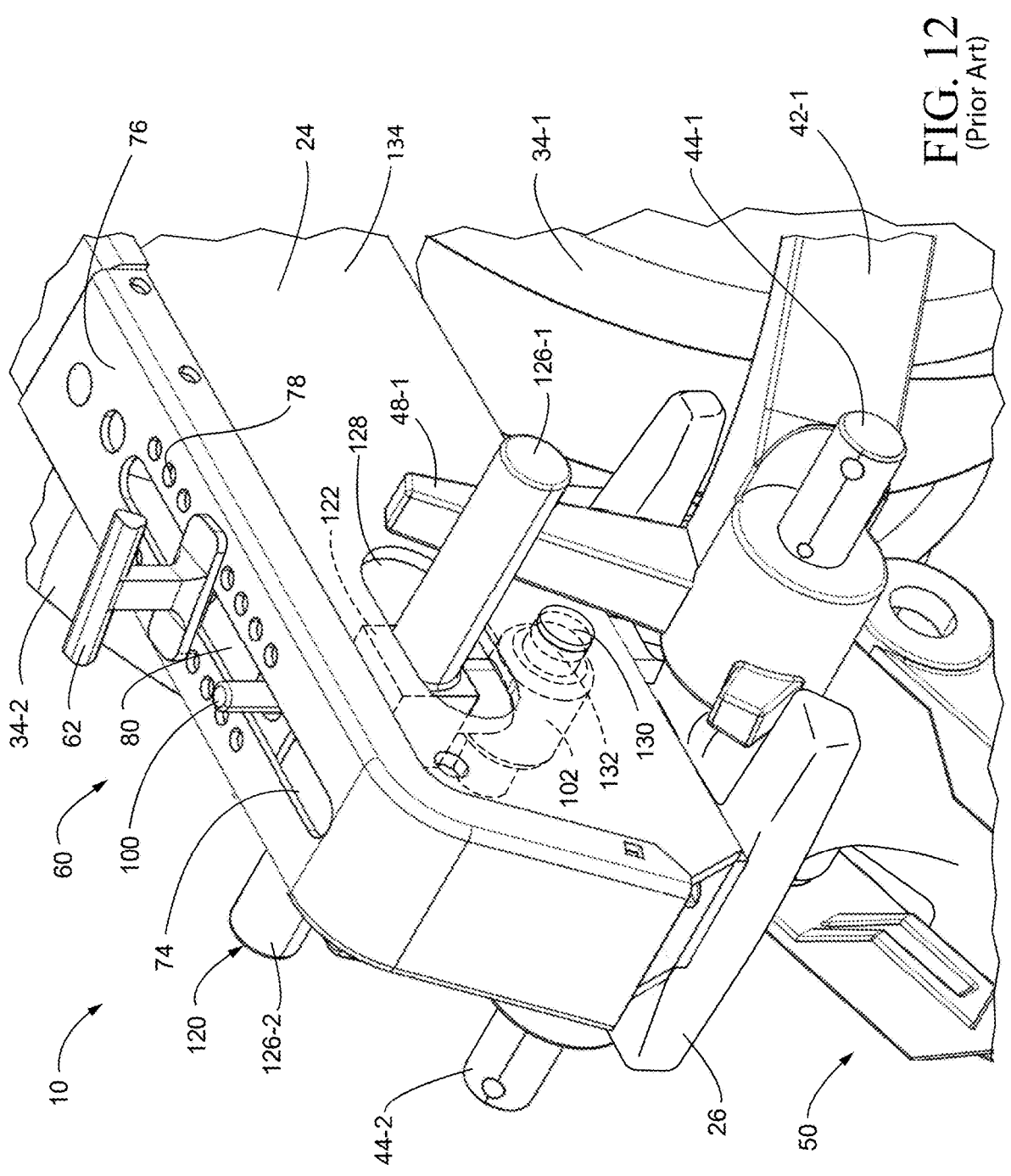
FIG. 12 is a further enlarged perspective view of a portion of the row unit of FIG. 11.
Figure 13:
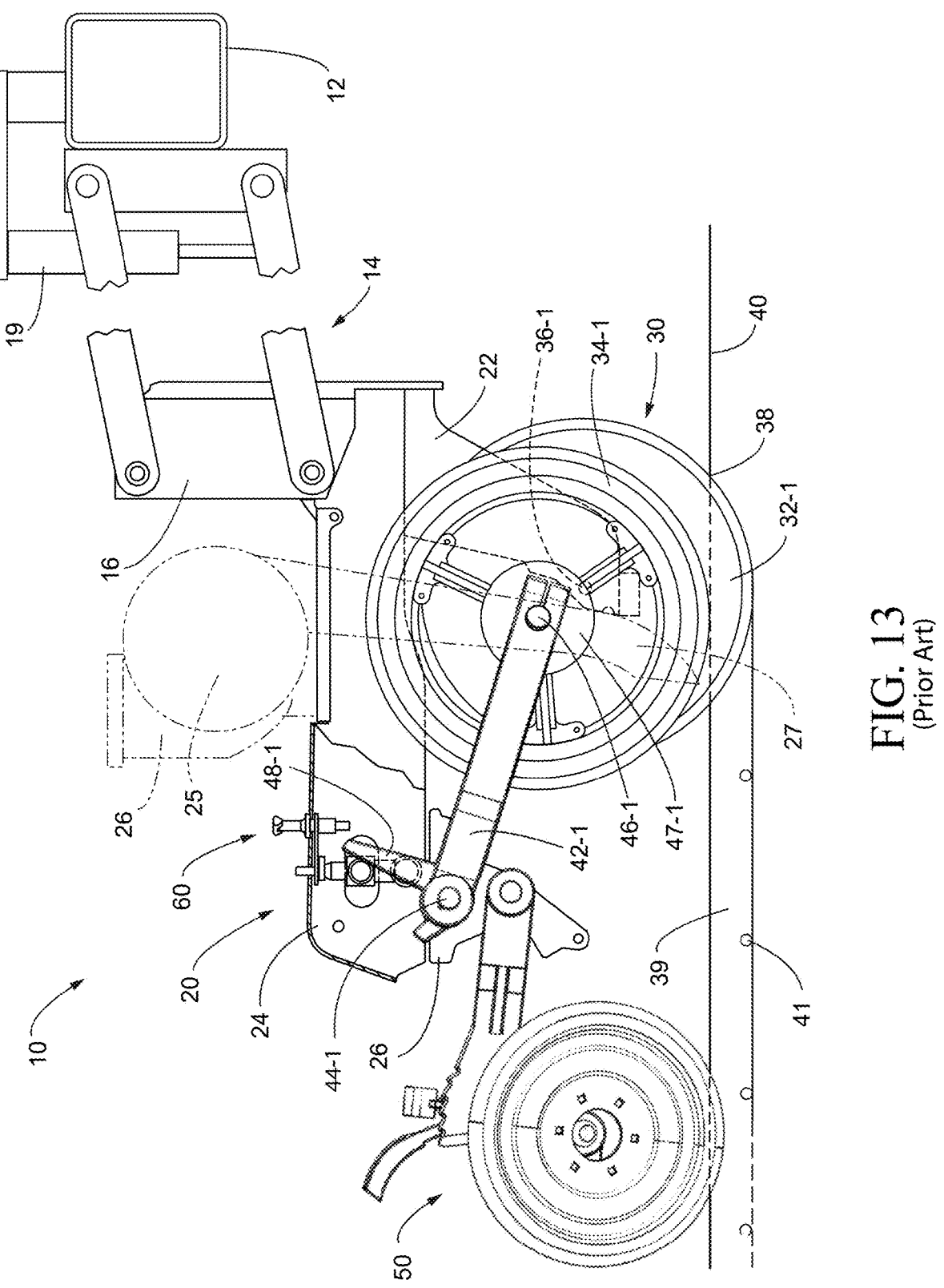
FIG. 13 is a side elevation view of the row unit of FIG. 10 with the beam of the existing row unit frame in a partial cross-sectional to illustrate the depth adjustment mechanism.

Referring now to the drawings, wherein like reference numerals designate identical or corresponding parts throughout the several views, FIG. 10 is a rear perspective view of a planter row unit designated generally by reference numeral 10. FIG. 11 in an enlarged perspective view of a portion of the planter row unit 10. FIG. 12 is a further enlarged perspective view of a portion of the planter row unit of FIG. 11. FIG. 13 is a side elevation view of the planter row unit 10. As recognized by those of skill in the art, the planter row unit 10 would be one of many row units spaced laterally along a toolbar 12 of an agricultural planter, with the toolbar 12 extending transverse to the forward direction of travel of the planter as indicated by arrow 11.

The row unit 10 is supported from the toolbar 12 by a parallel linkage 14 which permits each row unit 10 to move vertically independently of the toolbar 12 and the other spaced row units of the planter in order to accommodate changes in terrain or upon the row unit encountering a rock or other obstruction as the planter is drawn through the field during planting operations. The row unit 10 as shown in FIG. 10 is intended to be representative of a John Deere planter model number 9000, 1100 or 2100, each of which has a substantially similar configuration. It should be appreciated, however, that although reference is made throughout this specification to particular makes and models of planters, such references are examples only and are made to provide context and a frame of reference for the subject matter discussed. As such, the appended claims should not be construed as being limited to any particular make(s) or model(s) of planter row unit, but rather to those row units having the structural elements recited in the appended claims.

Each row unit 10 includes a forward bracket 16 to which the rearward end of the parallel linkage 14 is pivotally attached. The forward bracket 16 supports the row unit frame 20. The row unit frame 20 includes a downwardly extending forward shank 22 (FIG. 13) and a rearwardly extending beam 24. The rearward end of the beam 24 supports a rearward mounting structure 26 to which a furrow opening assembly 30 and a furrow closing assembly 50 are attached. An actuator 19, hydraulic or pneumatic, including an airbag, may be mounted to the toolbar 12 and the parallel linkage 14 to apply supplemental downforce and optionally a lift force to the row unit 10.

Figure 1:
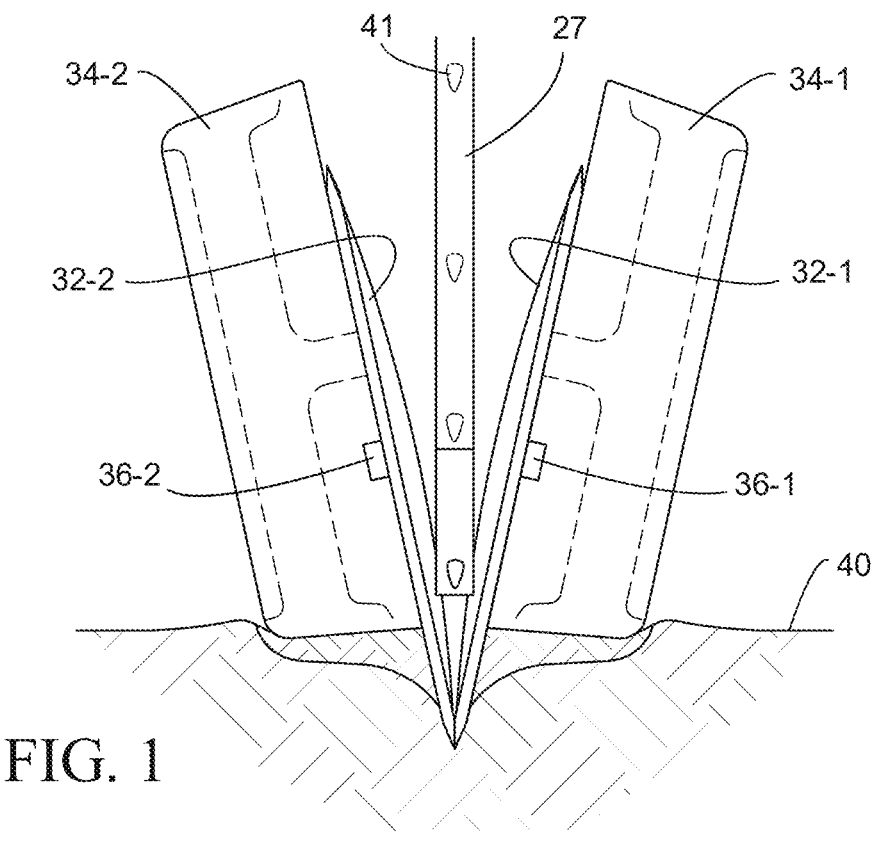
FIG. 1 represents a soil profile under a furrow opening assembly of a planter row unit in which ideal downforce is being applied.
Figure 2:
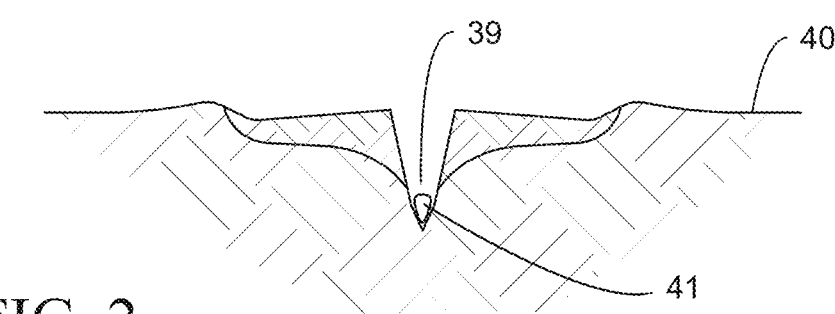
FIG. 2 illustrates the soil profile of FIG. 1 after the seed is deposited and prior to the furrow being covered with soil by the furrow closing assembly.

The furrow opening assembly 30 includes first and second furrow opening disks 32-1, 32-2 and first and second gauge wheels 34-1, 34-2. The first and second disk blades 32-1, 32-2 are rotatably supported on a respective shaft 36-1, 36-2 supported by the shank 22. The disk blades 32-1, 32-2 are canted such that the outer peripheries of the disks come in close contact at the point of entry 38 (FIG. 13) into the soil and diverge upwardly and rearwardly away from the direction of travel 11, such as shown in FIG. 1, for example. Thus, as the row unit 10 is drawn through the field, the furrow opening disks 32-1, 32-2 cut a V-shaped furrow 39 (FIG. 13) through the soil surface 40.

Referring to FIG. 12, the gauge wheels 34-1, 34-2 are each supported by a respective forwardly extending gauge wheel arm 42-1, 42-2 (only the first gauge wheel arm 42-1 is visible in the drawing figures, but the second gauge wheel 42-2 is a mirror image of the first gauge wheel arm 42-1). The first and second gauge wheel arms 42-1, 42-2 are pivotally supported at their rearward end by a respective first and second shaft 44-1, 44-2 which extend laterally outwardly from opposing sides of the rearward mounting structure 26. The gauge wheels 34-1, 34-2 are rotatably secured at the forward end of the respective first and second gauge wheel arms 42-1, 42-2 by respective first and second spindles 46-1, 46-2 and respective first and second hubs 47-1, 47-2 (only the first spindle and first hub 46-1, 47-1 are visible in the drawing figures). The rearward end of each first and second gauge wheel arms 42-1, 42-2 each includes upwardly extending first and second abutment member 48-1, 48-2, respectively (only the first abutment member 42-1 is visible in the drawing figures). The purpose of the abutment members 48-1, 48-2 is discussed later.

Figure 3:
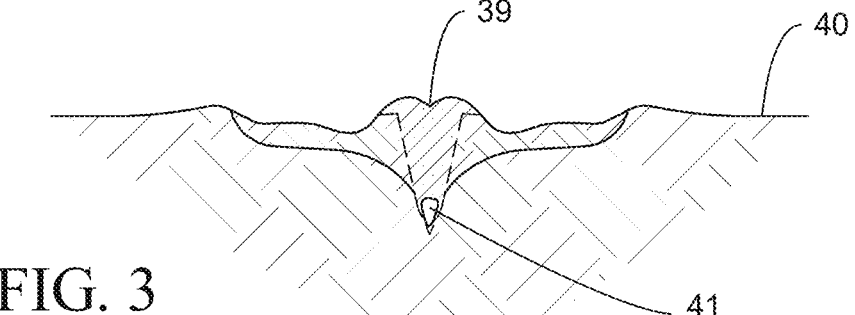
FIG. 3 illustrates the soil profile of FIG. 2 after the furrow is covered with soil by the furrow closing assembly.
Figure 4:
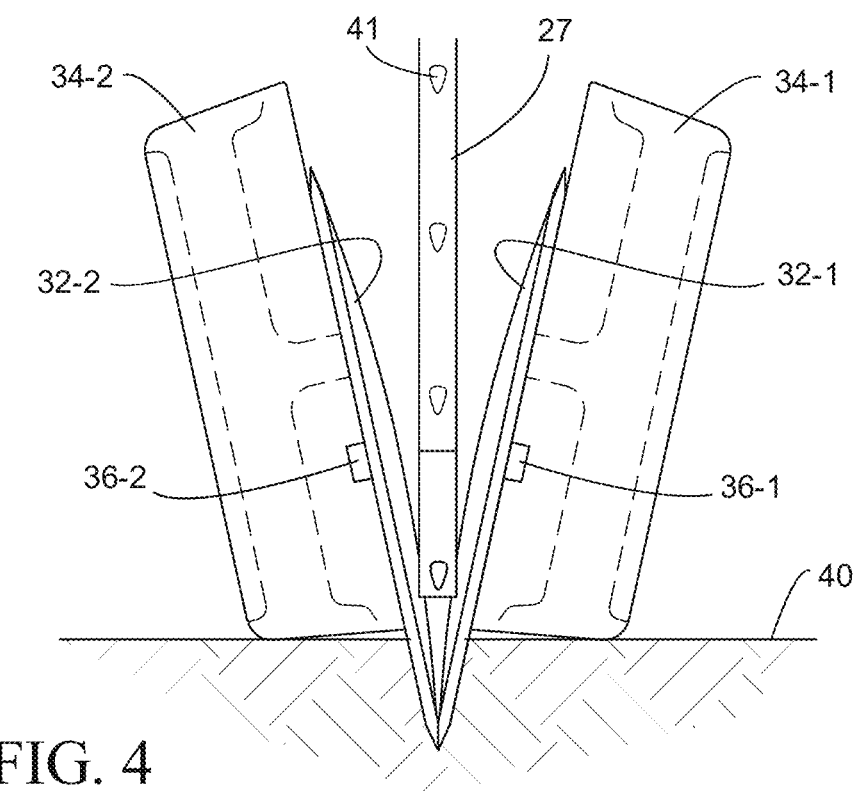
FIG. 4 represents a soil profile under a furrow opening assembly of a planter row unit in which too little downforce is being applied.
Figure 5:
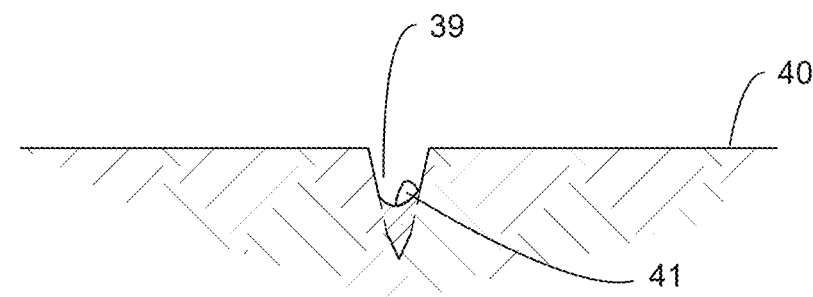
FIG. 5 illustrates the soil profile of FIG. 4 after the seed is deposited and prior to the furrow being covered with soil by the furrow closing assembly.
Figure 6:
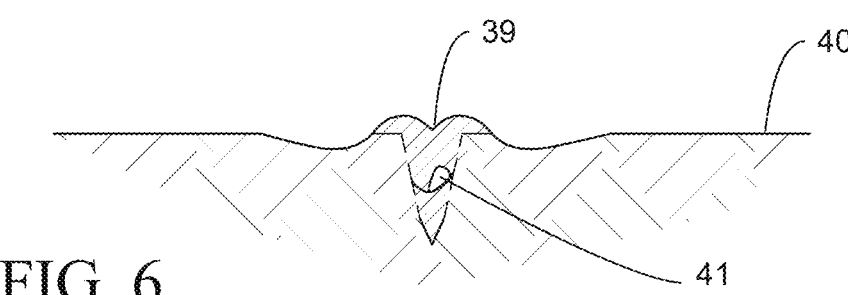
FIG. 6 illustrates the soil profile of FIG. 5 after the furrow is covered with soil by the furrow closing assembly.
Figure 7:
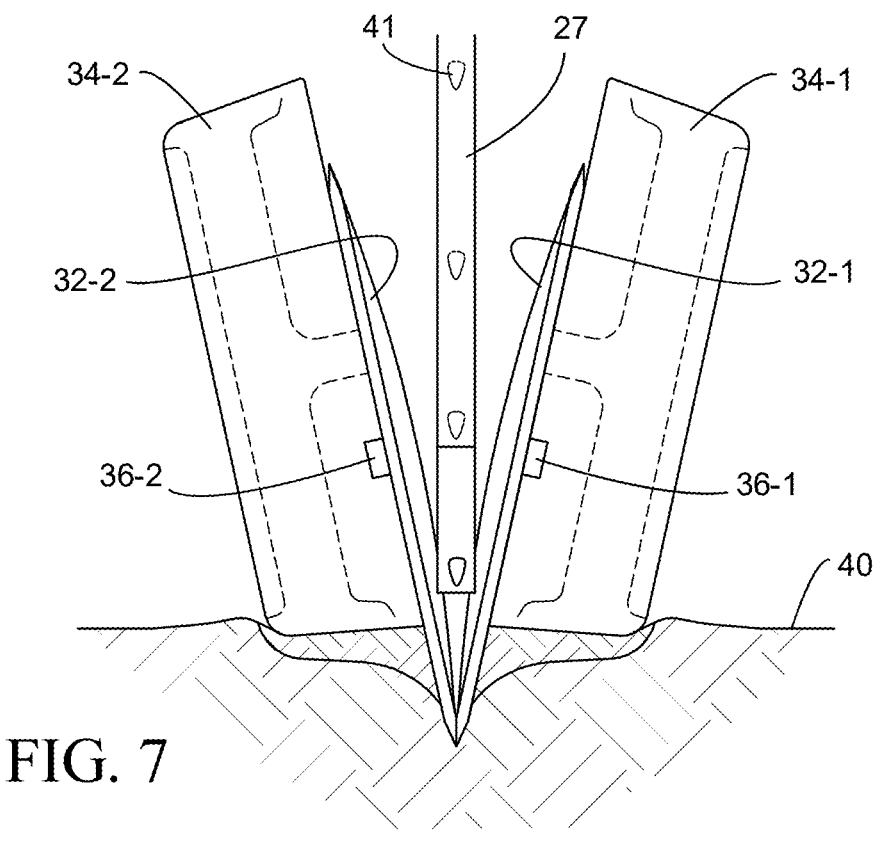
FIG. 7 represents a soil profile under a furrow opening assembly of a planter row unit in which excess downforce is being applied.
Figure 8:
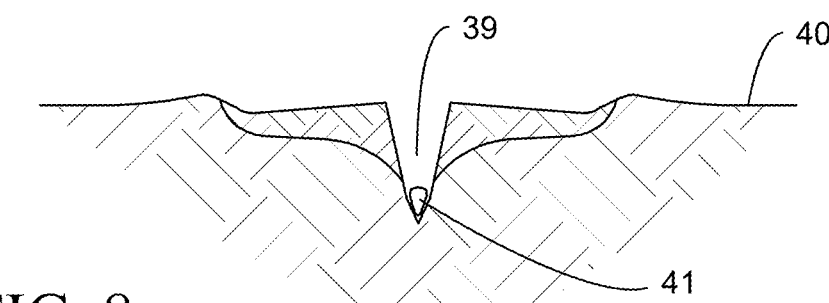
FIG. 8 illustrates the soil profile of FIG. 7 after the seed is deposited and prior to the furrow being covered with soil by the furrow closing assembly.
Figure 9:
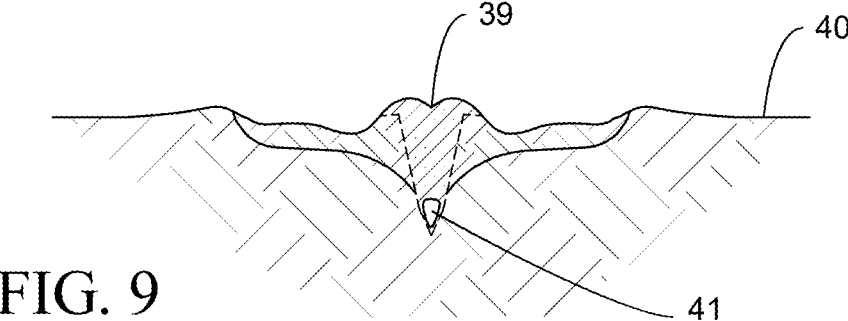
FIG. 9 illustrates the soil profile of FIG. 8 after the furrow is covered with soil by the furrow closing assembly.

As shown in FIG. 13, the beam 24 also supports a seed meter 25, a seed hopper 26, and a seed tube or seed conveyor 27. The seed tube or seed conveyor 27 passes through the opening 28 (FIG. 11) in the beam 24. In operation, as is well known in the art, the hopper 26 communicates seed to the seed meter 25. The seed meter 25 dispenses singulated seed 41 into the seed tube or seed conveyor 27. The seed tube or seed conveyor 27 directs the singulated seed 41 downwardly and rearwardly between the opening disks 32-1, 32-2 (FIG. 1) for depositing into the open seed furrow 39 before the seed furrow 39 is closed by the furrow closing assembly 50. The furrow closing assembly 50 directs the soil on each side of the open trench inward, thereby covering the deposited seeds 41 with soil (FIG. 3).

As is well known in the art, when the opening disks 32-1, 32-2 rotate through the soil cutting the V-shaped furrow, the soil tends to adhere to the rearward side of the disks rotating out of the soil, which, if not prevented, may cause the furrow walls to be torn away as the disks rotate out of the soil causing poor furrow formation and/or collapse of the furrow walls, resulting in irregular seed planting depth. Thus, as best illustrated in FIGS. 1 and 13, to prevent the furrow walls from being torn away by the disks exiting the soil, the gauge wheels 34-1, 34-2 are positioned to compact the strip of soil adjacent to the furrow 39 while at the same time serving to scrape against the outer face of the opening disks 32-1, 32-2 to shear off any soil buildup as the disks rotate out of the soil. Accordingly, the opening disks 32-1, 32-2 and the gauge wheels 34-1, 34-2 cooperate to form uniform furrow walls. As discussed in the Background section above, however, it is important that enough downforce is exerted on the row unit 10 to ensure proper furrow formation, but not too much downforce that will cause excess soil compaction of the surrounding soil which can have an adverse effect on seed germination and root penetration.

Figure 15:
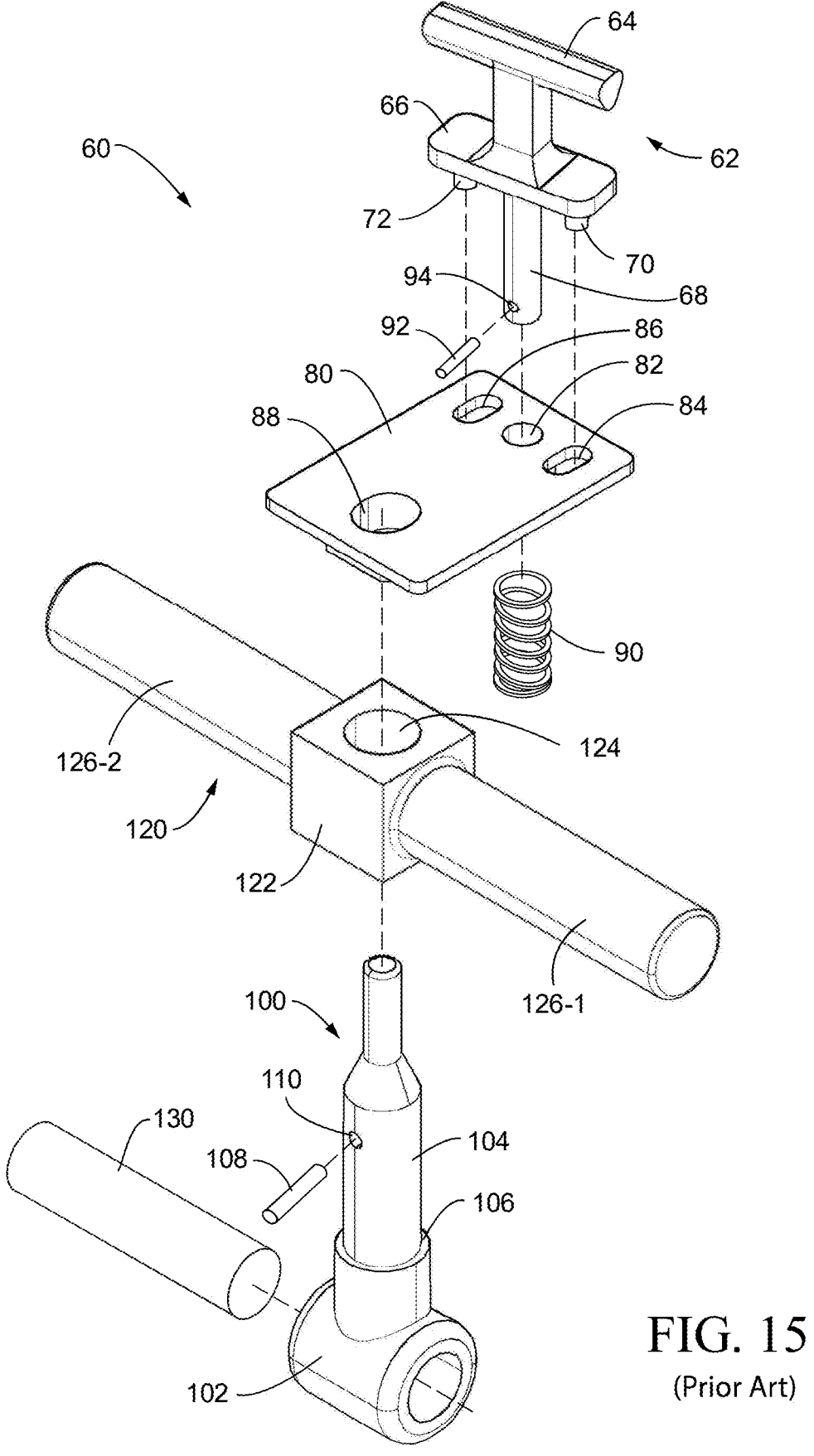
FIG. 15 is an exploded perspective view of the existing depth adjustment mechanism of FIG. 14.

The row unit 10 includes a depth adjustment mechanism 60. FIG. 14 shows the depth adjustment mechanism 60 with the beam 24 and other components of the row unit 10 removed for clarity. FIG. 15 is an exploded view of FIG. 14. The depth adjustment mechanism 60 includes a depth selector 62 that is selectively positionable along the beam 24. The depth selector 62 is coupled via a coupling plate 80 to a connector rod 100 which is coupled to a stop member 120. As described in more detail below, the stop member 120 engages with the abutment members 48-1, 48-2 on the gauge wheel arms 42-1, 42-2, thus limiting the upward rotational movement of the gauge wheel arms 42-1, 42-2 relative to the opening disks 32-1, 32-2, thereby controlling the depth of the furrow 39.

The depth selector 62 includes a T-shaped handle 64 or any other suitably configured handle for grasping by the operator. As best shown in the exploded view of FIG. 15, the depth selector 62 includes a base 66 with a downwardly extending post 68 and downwardly projecting pegs 70, 72 spaced on each side of the post 68. The post 68 extends through a longitudinal slot 74 (FIG. 12) in the top plate 76 of the beam 24. The pegs 70, 72 are sized to be received within a series of apertures 78 (FIG. 12) in the top plate 76 of the beam 24 on each side of the slot 74. A coupling plate 80 is disposed below the top plate 76 of the beam 24 and has a width wider than the slot 74. The coupling plate 80 includes a hole 82 that receives the downwardly extending post 68 of the depth selector 62. The coupling plate 80 also includes laterally spaced openings 84, 86 that are sized to receive the pegs 70, 72 of the depth selector 62. The rearward end of the coupling plate 80 includes an opening 88 sized to receive an upper end of the connector rod 100 as best illustrated in FIG. 14. The upper end of the connector rod 100 also projects upwardly through the slot 74 in the top plate 76 of the beam 24 as best shown in FIG. 12.

The portion of the post 68 extending below the coupling plate 80 receives a spring 90 which is retained on the post 68 by a pin 92 received within an opening 94 in the lower end of the post 68. Thus, it should be appreciated that the spring 90 biases the depth selector 62 downwardly so that the pegs 70, 72 will remain engaged within the apertures 78 in the top plate 76 of the beam 24. When it is desired to adjust the position of the depth selector 62, the operator lifts upwardly on the handle 64 forcing the spring 90 to compress and disengaging the pegs 70, 72 from the apertures 78 in the top plate 76 of the beam 24. While maintaining the upward force on the handle 64, the operator may then slide the depth selector 62 along the slot 74 to a desired position. With the pegs 70, 72 aligned with apertures 78 at the desired position, the operator releases the upward force and the spring bias maintains the pegs 70, 72 in the selected apertures 78 until the operator again lifts up on the handle 64 overcoming the spring bias.

Referring to the exploded view of FIG. 15, the connector rod 100 includes a bushing 102 with an integral rod portion 104. The central block 122 of the stop member 120 is retained on the rod portion 104 between a lower shoulder 106 and a retaining pin 108 received within an aperture 110 in the rod portion 104. The bushing 102 receives a pivot shaft 130. As best viewed in FIG. 12, the lateral ends of the pivot shaft 130 are received by and retained within opposing apertures 132 on opposing sidewalls 134 of the beam 24 (only one aperture 132 is visible in the drawing figures). In one embodiment, the pivot shaft 130 is rotationally fixed with the bushing 102 such that as the pivot shaft 130 rotates within apertures 132 in the beam sidewalls 134, the connector rod 100 rotates with the pivot shaft 130. In another embodiment, the pivot shaft 130 is rotationally fixed within the apertures 132 in the opposing sidewalls 134 of the beam 24 and the bushing 102 rotates about the rotationally fixed pivot shaft 130.

The stop member 120 includes a central block 122 having a through-bore 124 (FIG. 15) sized to receive the rod portion 104 of the connector rod 100 as best illustrated in FIG. 14. The stop member 120 is secured onto the connector rod 100 by a pin 108 received within a hole 110 in the rod portion 104 of the connector rod 100. Extending laterally outward from the central block 122 are first and second stop arms 126-1, 126-2. As best viewed in FIG. 12, the first and second stop arms 126-1, 126-2 extend through elongated openings 128 in the opposing sidewalls 110 of the beam 24 (only one elongated opening 128 is visible in the drawing figures). The outwardly projecting stop arms 126-1, 126-2 of the stop member 120 will act as stops when the abutment members 48-1, 48-2 on the respective gauge wheel arms 42-1, 42-2, abut the stop arms 126-1, 126-2 preventing the gauge wheel arms 42-1, 42-2 from further upward rotation (i.e., counter-clockwise as viewed in FIGS. 12 and 13).

Thus, it should be appreciated that if a shallower furrow depth is desired, the position selector 62 is moved forwardly along the beam 24 as described above by the operator pulling upward on the handle 64 to disengage the pegs 70, 72 from the apertures 78 and then reseating the pegs 70, 72 in more forward apertures 78 in the beam 24. The forward movement of the position selector 62 will, in turn, move the coupling plate 80 forwardly, forcing the connector rod 100 to pivot forwardly (in the clockwise direction in FIGS. 12 and 13) about the pivot shaft 106. The forward rotation of the connector rod 100, will move the stop arms 126-1, 126-2 forwardly within the elongated openings 128. The farther forward the stop arms 126-1, 126-2 are moved within the elongated openings 128, the sooner the abutment members 48-1, 48-2 on the gauge wheel arms 42-1, 42-2 will abut the respective stop arms 126-1, 126-2, limiting the amount of upward rotational movement (in the counter-clockwise direction in FIGS. 12 and 13) of the gauge wheel arms 42-1, 42-2 and thus limiting the upward movement of the gauge wheels 34-1, 34-2 relative to the opening disks 32-1, 32-2 producing a shallower furrow 39. Conversely, if a deeper furrow depth is desired, the position selector 62 is moved rearwardly along the beam 24 as described above by the operator again pulling upward on the handle 64 to disengage the pegs 72 from the apertures 78 and then reseating the pegs 70, 72 in more rearward apertures 78 in the beam 24. The rearward movement of the position selector 62 will, in turn, move the coupling plate 80 rearwardly, forcing the connector rod 100 to pivot rearwardly (in the counter-clockwise direction in FIGS. 12 and 13) about the pivot shaft 130. The rearward rotation of the connector rod 100, will move the stop arms 126-1, 126-2 rearwardly within the elongated openings 128. The farther rearward the stop arms 126-1, 126-2 are moved within the elongated openings 128, the later the abutment members 48-1, 48-2 on the respective gauge wheel arms 42-1, 42-2 will abut the respective stop arms 126-1, 126-2, increasing the amount of upward rotational movement (in the counter-clockwise direction in FIGS. 12 and 13) of the gauge wheel arms 42-1, 42-2 and thus increasing the upward movement of the gauge wheels 34-1, 34-2 relative to the opening disks 32-1, 32-2 producing a deeper furrow 39.

It should be appreciated that in addition to the stop member 120 serving as a stop against upward rotation of the gauge wheel arms 42-1, 42-2 as previously described, the stop member 120 is able to pivot with respect to the connector rod 100 to serve the dual function of "equalizing" or distributing the load carried by the two gauge wheels 34-1, 34-2, resulting in more uniform furrow depth. For example, if one gauge wheel 34-1, encounters a rock or obstruction in the field, the sudden upward movement of the one gauge wheel 34-1 and gauge wheel arm 42-1 will force the stop member 120 to pivot about the connector rod 100 transferring some of the load to the second gauge wheel arm 42-2 and second gauge wheel 34-2 to equalize the load between the gauge wheels 34-1, 34-2.

It should also be appreciated that during planting operations, substantially the entire downforce of the row unit 10 (comprising live load, the dead load and any supplemental downforce applied to the row unit via the actuator 19) will be carried by the gauge wheels 34-1, 34-2 once the opening disks 32-1, 32-2 penetrate into the soil to the depth where the abutments 48-1, 48-2 on the gauge wheel arms 42-1, 42-2 abut the stop arms 126-1, 126-2 at the preselected position of the depth selector 62. This load is transferred by the gauge wheels 34-1, 34-2 to the gauge wheel arms 42-1, 42-2, then through the abutments 48-1, 48-2 to the stop member 120 and then to the connector rod 100 before ultimately being distributed to the row unit frame 20 by the pivot shaft 130 and to the pegs 70, 72 of the depth selector 62 via the coupling plate 80.

The load exerted on the connector rod 100 by the stop member 120 is primarily a horizontal load, and because the connector rod 100 is pivotally attached to beam 24 via the pivot shaft 130, the connector rod 100 is both vertically and horizontally restrained at its lower end and it is horizontally restrained at its upper end by the coupling plate 80, such that the connector rod 100 is primarily subject to bending stresses. Accordingly, it should be appreciated that if the connector rod 100 is instrumented with a load sensor, such as a strain gauge, the strain in the connector rod may be correlated to the downforce being applied by the gauge wheels 34-1, 34-2 on the soil surface.

Figure 16B:
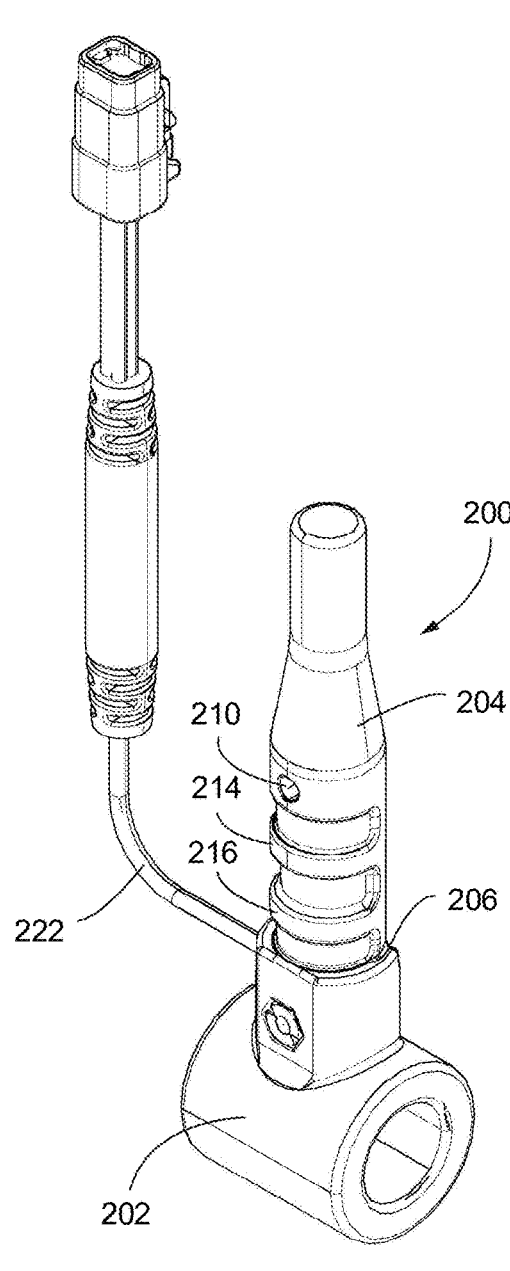
Figure 16C:
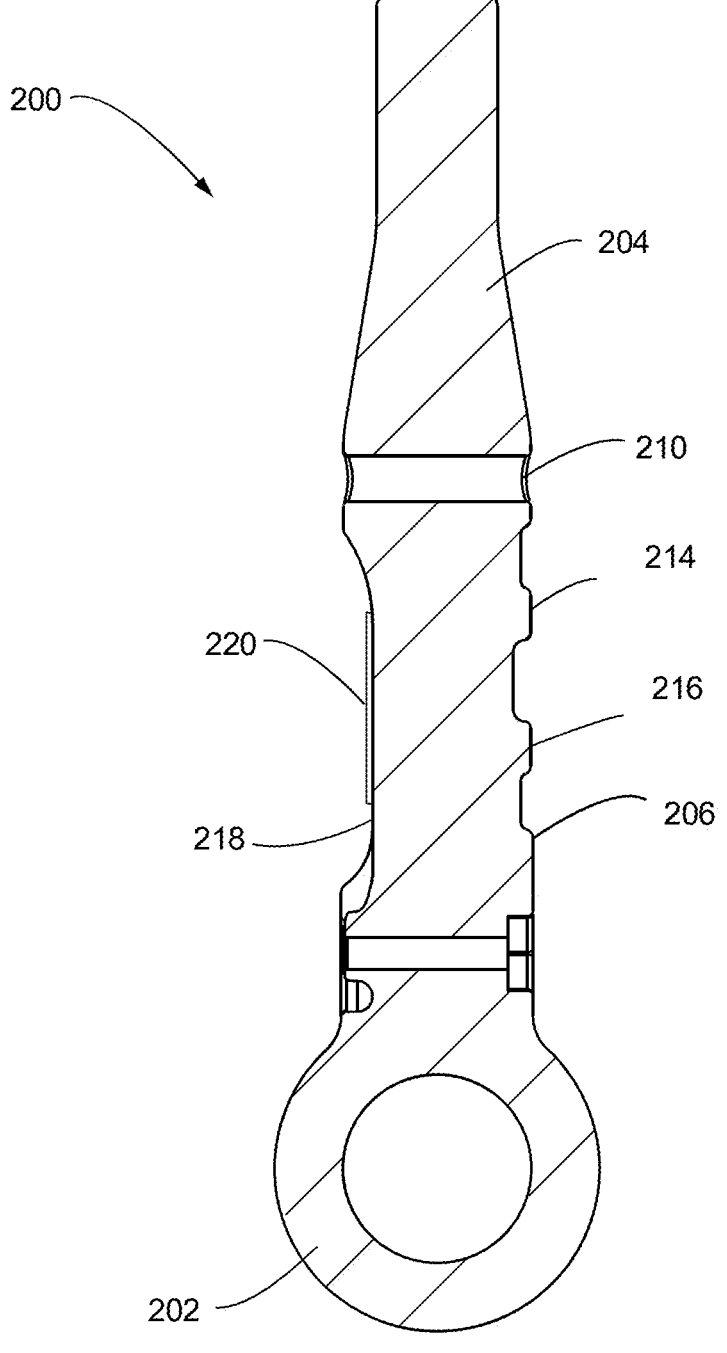
FIG. 16C is a cross-section of the load sensing connector rod as viewed along lines C-C of FIG. 16A.

FIGS. 16A-16C, 17 and 18 illustrate an embodiment of load sensing connector rod 200. FIG. 16A is a rear perspective view of the load sensing connector rod 200. FIG. 16B is a front perspective view of the load sensing connector rod 200. FIG. 16C is a cross-sectional view of the load sensing connector rod 200 as viewed along line C-C of FIG. 16A. FIG. 17 is a perspective view of the depth adjustment mechanism 60 incorporating the load sensing connector rod 200. Comparing FIG. 17 to FIG. 14, it should be recognized that apart from the load sensing connector rod 200 replacing the connector rod 100, there are no other structural changes are made to the depth adjustment mechanism 60 or to the row unit 10. FIG. 18 is a cross-section of the depth adjustment mechanism 60 incorporating the load sensing connector rod 200 as viewed along lines 18-18 of FIG. 17 and showing the load L applied by the stop member 120 via the central block 122 and the reactionary forces R1 provided by the pivot shaft 130 and the reactionary force R2 provided by the coupling plate 80.

Referring to FIG. 17, Similar to the connector rod 100, the load sensing connector rod 200 includes a bushing 202 with an integral instrumented rod portion 204 sized to be received within the through-bore 124 in the central block 122 of the stop member 120. The upper end of the instrumented rod 204 extends through the opening 88 in the coupling plate 80. As with the connector rod 100, the central block 122 is vertically restrained on the load sensing connector rod 200 between the rod shoulder 206 (FIGS. 16A-16C) and the pin 208 received within the aperture 210. Referring to FIGS. 16A-16C and 18, the instrumented rod portion 204 is configured with two bearing ribs 214, 216 through which the load L from the central block 122 of the stop member 120 is transferred to the load sensing connector rod 200; each lobe 214, 216 therefore transferring one half of the load (L/2). Because the applied load L is approximately in the middle of the rod portion 204, the reactionary force R1 at the pivot shaft 130 and the reactionary force R2 at the coupling plate 80 will each be approximately one half the applied load L. A load sensor 220 is positioned on the rod portion 204 to measure strain in the rod portion 204 due to the applied load L and the reactionary forces R. The load sensor 220, such as a strain gauge, may generate a load signal, such as a voltage, corresponding to or proportional to the strain in the rod portion due to the applied load L. The rod portion 204 may include a flat surface 218 directly opposite the direction of the applied load by the stop member 120. The load sensor 220 may be positioned on the flat surface 218 spanning the distance between the bearing ribs 214, 216. In this position, the load signal generated by the load sensor 220 will correspond accurately and consistently with the strain in the rod portion 204 due to the load L applied by the stop member 120. The load signal generated by the load sensor 220 may be communicated via a signal line 222 to a planter monitor (not shown) such as a 20/20 planter monitor available from Precision Planting, LLC, 23207 Townline Road, Tremont, IL 61568, or to other appropriate processing circuitry as recognized by those of skill in the art. The monitor or processing circuitry may be configured to generating load values corresponding to the load signals generated by the load sensor 220, the generated load values corresponding to the downforce being exerted on the ground surface by the gauge wheels 34-1, 34-2.

For example, if the load sensor 220 is a strain gauge, it is known that a strain gauge outputs a voltage signal proportional to strain measured by the strain gauge. Thus, the voltage signal may be correlated to the downforce load value exerted by the gauge wheels 34-1, 34-2 on the soil. Alternatively, the strain measured by the load sensing connector rod 200 may be correlated to known downforce load values programmed into the monitor or a microcontroller comprising the processing circuitry. The monitor or microcontroller may be programed to display the downforce load value to the operator in the cab of the tractor pulling the planter. Additionally, the monitor or a microcontroller may be programed to control the actuator 19 to increase or decrease the supplemental downforce to the row unit 10 if the strain in the load sensing connector rod 200 (and thus the downforce applied by the gauge wheels 34-1, 34-2) is less than or greater than a set threshold range, thereby automatically maintaining the appropriate amount of downforce on the row unit as the planter traverses the field. Additionally, the downforce load values may be stored in memory and associated with Global Positioning System (GPS) coordinates using the planter's GPS system to generate a field map showing the downforce values generated across the field of each row unit of the planter as it traverses the field.

EXAMPLES

The following are nonlimiting examples.

Example 1—A planter row unit, comprising: a row unit frame having a forward end toward a forward direction of travel of the planter row unit; an opening assembly supported by the row unit frame, the opening assembly having first and second opening disks configured to form a furrow in a soil surface when the row unit is drawn in the forward direction of travel, the opening assembly further having first and second gauge wheels applying a downforce to the soil, the first and second gauge wheels supported by respective first and second gauge wheel arms pivotally attached to the row unit frame, each of the first and second gauge wheel arms including an abutment member; a depth adjustment mechanism including a depth selector coupled to a stop member that abuts with the abutment member of the first and second gauge wheel arms, the abutment members transferring a load to the stop member, the load corresponding to the downforce applied by the gauge wheels to the soil, the depth selector movable to selectable positions along the row unit frame, wherein movement of the depth selector along the row unit frame toward the forward direction of travel moves the stop member forwardly decreasing the upward pivotal movement of the gauge wheel arms, and wherein movement of the depth selector away from the forward direction of travel moves the stop member rearwardly increasing the upward pivotal movement of the gauge wheel arms; a load sensing connector rod pivotally attached to the row unit frame and coupled with the depth selector, the load sensing connector rod positioned such that stop member applies the load to the load sensing connector rod, the load sensing connector rod including a load sensor configured to generate a load signal corresponding to the load.

Example 2—the planter row unit of Example 1, wherein the load sensing connector rod extends through the stop member.

Example 3—the planter row unit of Example 2, wherein the stop member is capable of pivoting about the load sensing connector rod.

Example 4—the planter row unit of Example 3, wherein the pivoting of the stop member about the load sensing connector rod equalizes the load between the abutment members of the first and second gauge wheel arms.

Example 5—the planter row unit of any preceding Example, wherein the load sensing connector rod includes bearing ribs which bear against the stop member and through which the load is applied by the stop member to the load sensing connector rod.

Example 6—the planter row unit of any preceding Example, wherein the load sensing connector rod further includes a flat surface positioned directly opposite to where the load is applied to the load sensing connector rod by the stop member and wherein the load sensor comprises a strain gauge applied to the flat surface.

Example 7—the planter row unit of any preceding Example, further comprising processing circuitry in signal communication with the load sensor, the processing circuitry generating downforce load values corresponding to the load signals.

Example 8—the planter row unit of Example 7, wherein the processing circuitry is configured to display the generated downforce load values to an operator.

Example 9—the planter row unit of Example 7, further comprising an actuator configured to apply supplemental downforce to the planter row unit, wherein the processing circuitry is configured to automatically regulate the supplemental downforce to maintain the generated downforce load values within a threshold range as the agricultural implement traverses a field.

Example 10—the planter row unit of Example 7, wherein the load signals are correlated to known downforce load values programmed into a microcontroller of the processing circuitry.

Example 11—the planter row unit of Example 10, wherein the processing circuitry is configured to display the correlated downforce load values to an operator.

Example 12—the planter row unit of Example 10, further comprising an actuator configured to apply supplemental downforce to the planter row unit, wherein the processing circuitry is configured to automatically regulate the supplemental downforce to maintain the downforce load signals within a threshold range as the agricultural implement traverses a field.

Example 13—the planter row unit of Example 9, wherein the load values are stored in memory and associated with Global Positioning System (GPS) coordinates to generate a field map showing the downforce load values generated across the field for each row unit of the planter as it traverses the field.

Example 14—the planter row unit of Example 12, wherein the load values are stored in memory and associated with Global Positioning System (GPS) coordinates to generate a field map showing the downforce load values generated across the field for each row unit of the planter as it traverses the field.

The foregoing description and drawings are intended to be illustrative and not restrictive. Various modifications to the embodiments and to the general principles and features of the load sensing connector rod, the depth adjustment mechanism and the planter row units described herein will be apparent to those of skill in the art. Thus, the disclosure should be accorded the widest scope consistent with the appended claims and the full scope of the equivalents to which such claims are entitled.

The invention claimed is:

1. A planter row unit, comprising:
a row unit frame having a forward end toward a forward direction of travel of the planter row unit;
an opening assembly supported by the row unit frame, the opening assembly having first and second opening disks configured to form a furrow in a soil surface when the row unit is drawn in the forward direction of travel, the opening assembly further having first and second gauge wheels, the first and second gauge wheels supported by respective first and second gauge wheel arms pivotally attached to the row unit frame, each of the first and second gauge wheel arms carrying a load transferred by the first and second gauge wheels;
a first abutment member extending upwardly from the first gauge wheel arm;
a second abutment member extending upwardly from the second gauge wheel arm;
a depth selector movable to selectable positions along the row unit frame;
a stop member extending transverse to the forward direction of travel and positioned such that the stop member abuts with the first and second abutment members, whereby each of the first and second abutment members transfers the load from the first and second gauge wheel arms to the stop member;
a load sensing connector rod extending vertically through the stop member such that the load transferred to the stop member by the first and second abutment members is applied to the load sensing connector rod in a horizontal direction, whereby the load sensing connecting rod is subject primarily to bending stresses, the load sensing connector rod including a load sensor configured to generate load signals corresponding to the bending stresses.

2. The planter row unit of claim 1, wherein the stop member is horizontally pivotable about the load sensing connector rod.

3. The planter row unit of claim 2, wherein the stop member equalizes the load transferred by the first and second gauge wheel arms to the first and second abutment members by horizontally pivoting about the load sensing connector rod.

4. The planter row unit of claim 1, wherein a portion of the load sensing connector rod extending through the stop member includes bearing ribs which bear against the stop member and through which the horizontal load is applied by the stop member to the load sensing connector rod.

5. The planter row unit of claim 1, wherein a portion of the load sensing connector rod extending through the stop member includes a flat surface positioned directly opposite to where the horizontal load is applied to the load sensing connector rod by the stop member and wherein the load sensor comprises a strain gauge applied to the flat surface.

6. The planter row unit of claim 1, further comprising processing circuitry in signal communication with the load sensor, the processing circuitry generating downforce load values corresponding to the load signals.

7. The planter row unit of claim 6, wherein the processing circuitry is configured to display the generated downforce load values to an operator.

8. The planter row unit of claim 6, further comprising an actuator configured to apply supplemental downforce to the planter row unit, wherein the processing circuitry is configured to automatically regulate the supplemental downforce to maintain the generated downforce load values within a threshold range as the agricultural implement traverses a field.

9. The planter row unit of claim 8, wherein the load values are stored in memory and associated with Global Positioning System (GPS) coordinates to generate a field map showing the downforce load values generated across the field for each row unit of the planter as it traverses the field.

10. The planter row unit of claim 6, wherein the load signals are correlated to known downforce load values programmed into a microcontroller of the processing circuitry.

11. The planter row unit of claim 10, wherein the processing circuitry is configured to display the correlated downforce load values to an operator.

12. The planter row unit of claim 10, further comprising an actuator configured to apply supplemental downforce to the planter row unit, wherein the processing circuitry is configured to automatically regulate the supplemental downforce to maintain the downforce load signals within a threshold range as the agricultural implement traverses a field.

13. The planter row unit of claim 12, wherein the load values are stored in memory and associated with Global Positioning System (GPS) coordinates to generate a field map showing the downforce load values generated across the field for each row unit of the planter as it traverses the field.

14. The planter row unit of claim 1, further including a coupler configured to couple the load sensing connector rod with the depth selector, whereby, movement of the depth selector along the row unit frame toward the forward direction of travel moves the stop member forwardly along the row unit frame, thereby decreasing the upward pivotal movement of the gauge wheel arms, and whereby movement of the depth selector along the row unit frame away from the forward direction of travel moves the stop member rearwardly along the row unit frame, thereby increasing the upward pivotal movement of the gauge wheel arms.

15. The planter row unit of claim 14, wherein a lower end of the load sensing connector rod is pivotally attached to the row unit frame about a pivot axis such that the lower end of the load sensing connector rod is horizontally and vertically restrained relative to the row unit frame, and wherein an upper end of the load sensing connector rod is substantially horizontally restrained by the coupler.

16. The planter row unit of claim 1, wherein the stop member includes a first stop arm extending extending transverse to the forward direction of travel and a second stop arm extending transverse to the forward direction of travel, the first arm abutting with the first abutment member and the second arm abutting with the second abutment member.

\* \* \* \* \*